Jan. 2, 1968 G. T. MILLER 3,361,656
WICKING ELECTRODE FOR AN ELECTROLYTIC CELL
Filed May 16, 1966 3 Sheets-Sheet 1

Jan. 2, 1968　　　　　G. T. MILLER　　　　3,361,656
WICKING ELECTRODE FOR AN ELECTROLYTIC CELL
Filed May 16, 1966　　　　　　　　　　　　3 Sheets-Sheet 2 though the description of the apparatus of the invention is directed to a preferred embodiment, that of a longitudinally grooved and abraded cathode in an electrolytic cell adapted for the production of phosphine, it is to be understood that the apparatus may also be utilized when the other reactive materials are to be reacted with a product of the electrolysis.

United States Patent Office 3,361,656
Patented Jan. 2, 1968

3,361,656
WICKING ELECTRODE FOR AN ELECTROLYTIC CELL
George T. Miller, Lewiston, N.Y., assignor to Hooker Chemical Corporation, Niagara Falls, N.Y., a corporation of New York
Filed May 16, 1966, Ser. No. 550,245
14 Claims. (Cl. 204—101)

ABSTRACT OF THE DISCLOSURE

An electrode containing plural longitudinal grooves and lands, the latter containing a multiplicity of projections at an acute angle from the longitudinal grooves, and the use of the electrode in an electrolytic cell with a reactive material which is substantially insoluble in the electrolyte via the wicking action of the reactant on the electrode.

This application is a continuation-in-part of S.N. 262,-497, filed Mar. 4, 1963, now U.S. Patent 3,251,756, issued May 17, 1966.

This invention relates to a novel electrode. More particularly, it relates to a wicking type electrode to be utilized in an electrolytic cell, and to an unexpectedly improved process for reacting a material insoluble in the electrolyte of said cell with the product of electrolysis.

The difficulties encountered in readily and efficiently transferring a reactive material of low conductivity and of substantial insolubility in an electrolyte to the surface of an electrode where oxidation or reduction may take place have long been known in electro-chemistry and have been awaiting solution. It is known in the art that to effect a transfer of such a reactant material to an electrode often requires either vigorous agitation or the addition of solvent. Moreover, such transfer require special equipment and materials, such as stirrers, solvents and the like, which add to the cost and complexity of the system. Another problem encountered, which in many instances leads one to utilize chemical means to oxidize, reduce or otherwise change a reactant, is the lack of conductivity exhibited by certain reactants. Generally, when such reactants are utilized, a low current density is built up on the electrode causing the employment of unduly large apparatuses to compensate for the low current density.

Electrolytic cells, wherein phosphorus wicks up the cathode, have been utilized to produce phosphine. In such cells, phosphine is recovered in the catholyte gas. During the operation of the cell the yield of phosphine in the catholyte gas gradually diminishes due to the formation of spongy deposits on the surfaces of the cathode. The concentration of phosphine in the catholyte gas decreases as the size of and areas covered by these spongy coatings or deposits increase. The spongy coatings appear to be formed by deposits of metallic ions from either the electrolyte or the phosphorus usually at or near the cathode. The use of longitudinally grooved electrodes has effectively reduced the formation of these spongy coatings. However, at desirable amperage levels, the vertically or longitudinally grooved electrode, even when cross-grooved horizontally, become gas blanketed, reducing the generation of phosphine.

It is an object of this invention to provide a novel electrode for a wicking cell.

Another object is to effect mass transfer of a reactant, having low electrical conductivity and being substantially insoluble in an electrolyte, to the surface of a cathode whereby the product of electrolysis reacts more efficiently at the cathode with said reactant.

A further object is to provide an electrode in combination with an electrolytic cell wherein minimum resistance and maximum current density are combined with good discharge of the electrolytic products and by-products, with extended electrode and cell lives.

Other objects and advantages will become apparent hereinafter as the description of the invention proceeds.

Unexpectedly, it has been found that by utilizing the novel electrode of this invention mass transfer of a reactant material having low conductivity and substantial insolubility in an electrolyte, may be carried out in the absence of agitation and without the need for solvents, while a high current density is maintained on the electrode in contact with the reactant material, so as to promote a chemical reaction. Although the description of the apparatus of the invention is directed to a preferred embodiment, that of a longitudinally grooved and abraded cathode in an electrolytic cell adapted for the production of phosphine, it is to be understood that the apparatus may also be utilized when the other reactive materials are to be reacted with a product of the electrolysis.

The terms "wicking" and "wicking up" are used throughout the specification to describe the phenomenon by which the liquid or molten reactive material, e.g., phosphorus, when in contact with a lower portion of an electrode, rises to form a thin layer along the surface of the electrode above the level of the pool of reactive material in contact with the electrode.

In accordance with the invention, it has been found that the formation of spongy masses on a wicking type electrode and the gas blanketing of such an electrode in an electrolytic cell may be suppressed and avoided by providing a longitudinally grooved electrode whose lands or surface area has been grooved or abraded at an acute angle to longitudinal grooves. The referred to combination may be employed in a process for reacting a material, e.g., phosphorus, having a low electrical conductivity and substantial insolubility in an electrolyte with a product of electrolysis in an electrolytic cell having an anode, a cathode, a diaphragm and an electrolyte, comprising contacting the reactive material, e.g., phosphorus, with said wicking type cathode having defined thereon a plurality of longitudinal grooves whose abraded lands or surfaces define a multiplicity of narrow grooves at an acute angle to the longitudinal grooves which further define a multiplicity of projections and high burrs, whereby the referred to material wicks up the electrode to cover substantially its surface, maintaining an electrical current through said cathode, electrolyte and anode to effect reaction between the reactant material and the product of electrolysis, and recovering a desired product as a catholyte gas. When phosphorus is utilized as the reactive material, the evolved catholyte gas is phosphine.

The invention and modifications thereof are shown by the accompanying drawings, in which.

A description of the drawings is as follows.

Figure 1:
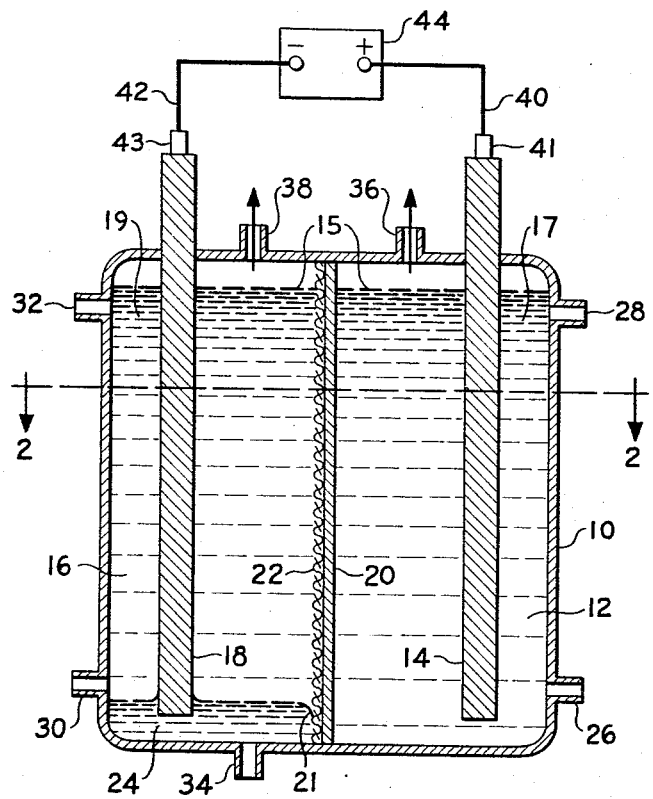
FIG. 1 is central sectional view in elevation of an electrolytic cell taken along plane 1—1 of FIGURE 2.

Referring to FIG. 1, there is shown a cell vessel 10 having an anode compartment 12, containing an anode 14, and a cathode compartment 16, containing a wicking type cathode 18 having grooves 48 and lands 46 thereon.

Figure 4:
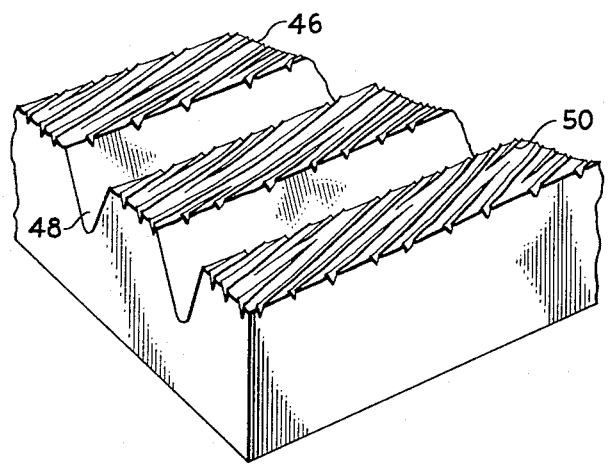
FIG. 4 is a sectional view of a preferred wicking type electrode of the invention, with the grooves and projections exaggerated for clear illustration.

Said lands 46 have abraded surfaces which define a plurality of edges and protrusions, as seen in FIG. 4. A porous diaphragm 20, separates the cell into an anode compartment 12 and a cathode compartment 16 and separates the electrolyte into anolyte 17 and catholyte 19, respectively. In the cathode compartment 16 is a reactive material 24, e.g., phosphorus. Diaphragm 20 is protected on the side facing the reactive material by a coating, cover or sheath 22, which prevents the adherence of the reactive material to the diaphragm. This action is evidenced by the convex meniscus 21. Ports 26 and 28 permit the addition and removal of anolyte 17 from the anode section 12. Ports 30 and 32 permit the addition and removal of catholyte 19 from the cathode section 16. Port 34 permits the addition and removal of molten phosphorus from the cathode section 16. Sufficient reactive material 24, e.g., molten yellow phosphorus, is added to the cathode compartment 16, to contact the lower portion of the wicking type cathode 18, thereby permitting wicking of the reactive material up the outer surface of the cathode. Anolyte gas discharge port 36 is provided at the top of the anode section to remove anolyte gas from the electrolytic cell. Catholyte discharge port 38 is provided on the top of cathode section 14 to remove catholyte gas. The level of the anolyte and catholyte in the electrolytic cell is indicated as interface 15.

Anode wire 40 and cathode wire 42 are connected to the anode and cathode and to the positive and negative poles of a source of direct current 44 through plugs 41 and 43, respectively. If desired, a heating source such as a constant temperature bath (not shown in the drawing) may be employed to maintain the catholyte and anolyte at a desired temperature.

Cell vessel 10 may be constructed of material capable of resisting corrosion by the electrolyte and reactive materials employed in the cell. Typical examples of such materials are glass, glazed ceramics, tantalum, titanium, hard rubber, polyethylene, rigid materials coated with phenol-formaldehyde resin, and the like.

Diaphragm 20 separating the anode section 12 from cathode section 16, may be a porous or semipermeable material resistant to the cell contents and capable of preventing the commingling of anodic and cathodic gases. Typical examples of such materials are porous alundum, porous porcelain, sintered glass, glass fabric, resin impregnated wool, fool felt, and diaphragms normally employed in lead storage batteries.

Figure 2:
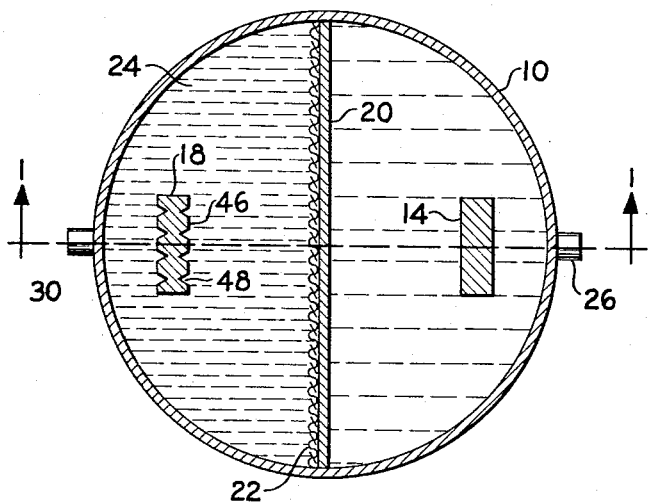
FIG. 2 is a horizontal sectional view taken along plane 2—2 of FIGURE 1.

Referring to FIG. 2, there is shown the relative position of cathode 18, anode 14 and porous diaphragm 20 in the cell vessel 10.

Figure 3:
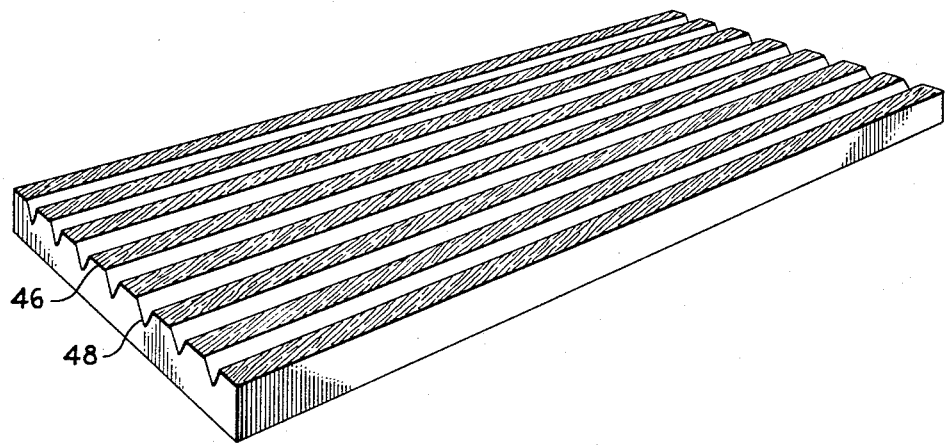
FIG. 3 is a perspective view of a preferred wicking type electrode of the invention.

FIGS. 3 and 4 illustrate a preferred embodiment of the novel electrode of this invention. In particular, it shows a flat electrode having a plurality of longitudinal grooves 48 defining a series of lands or surfaces 46 which in turn have thereon, at an angle to the longitudinal grooves, a plurality of narrow grooves which define a multitude of edges, protrusions, elevations, burrs and projections 50. The longitudinal or vertical grooves may be formed by machining, rolling, milling and the like. The abrading of the surfaces or lands defined by said longitudinal grooves may be effected by any suitable means as by utilizing abrasive means such as sand paper, emery cloth, stone, Carborundum wheels and the like. It is to be understood that suitable casting techniques such as precision casting or casting with further machining and the like, may also be employed to prepare the electrodes of this invention.

Figure 5:
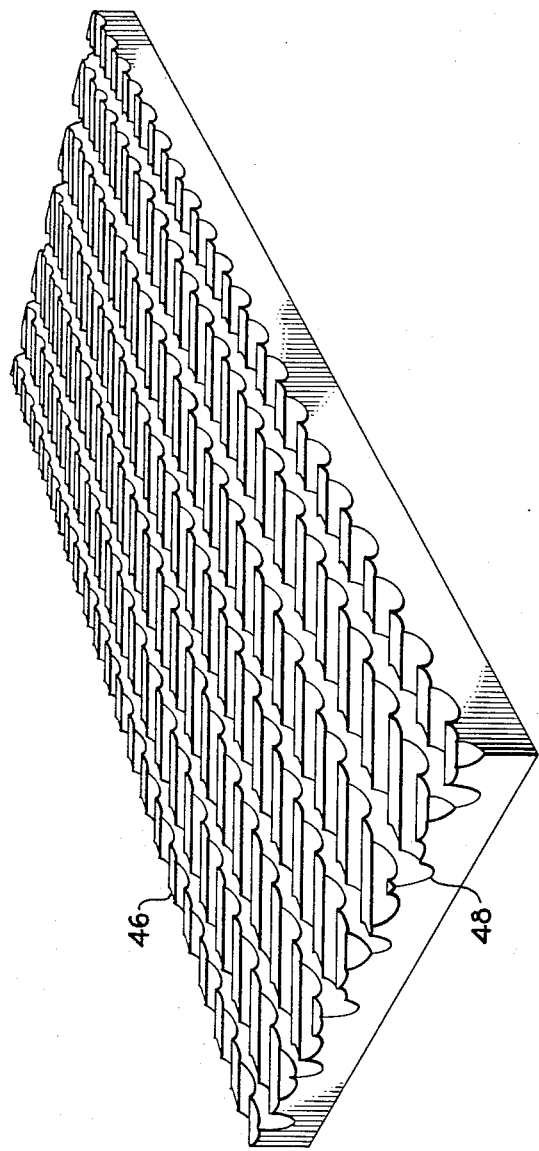
FIG. 5 is perspective view illustrating a corresponding modification of a wicking type electrode of the invention.

FIG. 5 illustrates a further embodiment of the electrode of this invention. The longitudinal or vertical grooves 48 shown thereon may be formed by machining, rolling, milling and the like. The grooves at an angle to longitudinal grooves having thereon a multitude of elevations, protrusions, edges, burrs and projections, may be formed by plowing, milling, scratching, and the like, and particularly by milling with a circular blade that has no set or even has a negative set so as to throw up high burrs. The discussed views of the electrode show but a part of the electrode's surface. It is within the scope of this invention to employ electrodes which have both sides or all the available surfaces grooved and abraded.

Preferably, the electrode is rolled to produce longitudinal grooves of a depth which may vary, depending upon the modification of the electrode desired. Particularly, the range for the depth of the longitudinal grooves may be about $1/32$ of an inch to 1 inch. The preferred range being from about $1/32$ of an inch to $1/8$ of an inch. The opening or width of grooves 46 may be in the range of about $1/64$ of an inch to $1/4$ of an inch, with a preferred width being in the range of about $1/64$ of an inch to $1/8$ of an inch. However, optimum results are achieved with widths in the range of about $1/32$ of an inch to $3/32$ of an inch. It is to be understood that the base of the longitudinal grooves may be of suitable shape and width. The number of grooves per inch on the electrode may be between about four and thirty-two, with between about four and twenty grooves per inch being preferred. Optimum results are obtained utilizing from about six to twelve grooves per inch. The width of the surface areas or lands defined by the longitudinal grooves is dependent upon the width and number of grooves present on the electrodes. Generally, the width of such lands may be in the range of $1/64$ inch to $15/64$ inch, preferably from $1/32$ inch to $1/8$ inch.

Following the initial grooving, the electrode may be drawn or rolled to produce smooth surface or lands between the previously described grooves. The groove widths and depths finally resulting are those given above. The surfaces or lands between the grooves are abraded or machined at an acute angle to the vertical or longitudinal grooves. Generally, the angle may be in the range of 1 to 75 degrees. Preferably, the angle is in the range of from 1 to 50 degrees, and most preferably from 5 to 15 degrees. The term "abraded or machined" is used to mean the process whereby grooves, protrusions, edges, burrs or projections are formed at the referred to angles to the longitudinal. The grooves may vary in depth from about $1/1000$ inch to about $1/10$ inch, preferably from about $1/250$ inch to about $1/25$ inch, and in width from about $1/1000$ inch to about $1/10$ inch, preferably from about $1/250$ inch to about $1/25$ inch. It is preferred to brade the electrode so as to produce irregular and minute grooves which define a multitude of the referred to sharp edges, protrusions and burrs. Such edges, protrusions, projections and burrs have sides which makes angles in the range of from 1 to 80 degrees, preferably from 1 to 45 degrees, and most preferably from about 1 to 10 degrees. Thus, the electrode is preferably produced by forming a plurality of longitudinal or vertical grooves on the surface of an electrically conductive material and abrading said surface at an acute angle to said longitudinal grooves.

Any solid material having a hydrogen overvoltage, as normally measured in the absence of the reactive material, e.g., phosphorus, exceeding the hydrogen overvoltage of smooth platinum may be employed as a cathode. Typical cathodic materials include lead-mercury amalgam, cadmium, tin, aluminum, nickel, alloys of nickel, such as Numetal (an alloy containing 77.2 percent nickel, 4.8 percent copper, 1.5 percent chromium and 14.9 percent iron), Monel, copper, silver, bismuth, and alloys thereof. For example, lead-tin, lead-bismuth, and tin-bismuth alloys may be employed. It is preferred to employ lead as the cathodic material.

It has been found that when a wicking type cathode in accordance with the invention is employed in a phosphine producing cell, the reactive material, that is, phosphorus, covers the cathodic surface more efficiently. Reservoirs of phosphorus are formed throughout the length of the cathode, thus preventing the formation of spongy masses on the cathodic surface. The wicking or climbing phosphorus covers or coats the entire surface of the electrode with a thin layer of phosphorus. It is considered that the wicking type electrode of this invention provides a multiplicity of edges, burrs, projections and protrusions for an electrolitic current to be concentrated thereon whereby the beneficial results disclosed herein such as operation of the cell for longer periods of time than previously possible without shutdown are effected. It is this multiplicity of high points and not the increased surface area that effects the beneficial results mentioned herein.

Suitable anode materials include lead, platinum, lead peroxide, graphite, and other materials capable of conducting a current and resisting corrosion under the employed electrolytic conditions.

An electrolyte which is unreactive with the reactive material or molten phosphorus, but is capable of forming hydrogen ions during electrolysis, is employed as a catholyte and anolyte. Typical examples of suitable electrolytes in aqueous solution are hydrochloric acid, sodium chloride, lithium chloride, potassium chloride, sodium sulfate, potassium sulfate, monosodium phosphate, disodium phosphate, acetic acid, ammonium hydroxide, phosphoric acid, sulfuric acid, and mixtures thereof. The concentration of the electrolyte in solution may be in the range of from about five to about ninety percent, water usually being the balance. A concentration in the range of about 10 and 75 percent is preferred, and a concentration in the range of about 5 to about 50 percent yields best results.

Improved results have been obtained when small proportions of metallic ions are present in the electrolyte. For example, ions of metals such as antimony, bismuth, lead, tin, cadmium, mercury, silver, zinc, cobalt, calcium, barium, and mixtures thereof may be employed. These metal ions may be introduced to the electrolyte by employing a consumable anode of the desired metal or metals such as a lead anode. Under such conditions, the metal ions are formed in the electrolyte and are transferred to the area adjacent to the cathode. If desired, salts or other compounds of metals, such as chloride, phosphates, acetates and the like, may be dissolved in the electrolyte. In another embodiment finely divided metal in elemental form may be dissolved in the electrolyte. Sufficient metal ion may be added to the electrolyte to provide a metal ion concentration of between about 0.01 and 3.0 percent by weight of electrolyte. The preferred range being between about 0.02 percent and 0.5 percent by weight of electrolyte and between about 0.01 and 0.5 percent also being a suitable range.

During electrolysis the temperature of the catholyte and anolyte may be maintained above the melting point of the reactive material, e.g., for phosphorus, about 44° centigrade, and below the boiling point of the electrolyte. Temperatures in the range of about 60 degrees centigrade to 110 degrees centigrade are satisfactory, with best yields of phosphine being obtained at temperatures in the range of about 70 degrees centigrade to about 100 degrees centigrade.

When an electric current is passed through the cell, the reactive material, e.g., molten phosphorus, present on the surface of the cathode is consumed in the formation of the catholyte gas. The catholyte gas in the case of phosphorus is predominately phosphine, containing some hydrogen. The anolyte gas depends on the overvoltages of the anions and the anolyte with reference to the anodic material. Thus, for example, the anolyte gas is predominately oxygen when sulfuric acid or phosphoric acid is used with a platinum anode, whereas the anolyte gas is predominately chlorine when hydrochloric acid is used as the anolyte. The coproduction of ionic oxidation products may be carried out in the anode compartment of the cell of this invention without departing from the spirit of the invention.

When phosphorus is utilized, it is consumed on the surface of the cathode reacting with hydrogen produced there to yield phosphine. Additional phosphorus passes from the molten pool of phosphorus to the vertical cathodic surface. The current density on the cathode is controlled so that the reservoir of phosphorus in the grooves is not totally consumed. Thus, as phosphorus is consumed from the reservoir in the grooves, it is readily replaced from the extra supply in the reservoir at the base of the electrode. The consumed phosphorus or other reactive material is replenished on the cathode surface continuously from the molten pool of phosphorus or other reactive material. The cathodic current density may be set by the operator for the cell and is dependent on the density yielding the best results as well as cell design and cathodic structure. Such cathodic current densities may be in the range of 30 amperes per square foot to 360 amperes per square foot, preferably from about 60 amperes per square foot to 300 amperes per square foot. Best results are obtained in the range of about 100 amperes per square foot to about 250 amperes per square foot.

The phosphine containing gas produced at the cathode has a relatively high concentration of phosphine, usually more than sixty percent, and it may be as high as ninety percent phosphine or higher by volume. The catholyte gas is substantially free from other phosphorus hydrides, but may contain hydrogen.

In the preferred embodiment of the invention, the lead plate electrode illustrated by FIG. 3 and a graphite rod are employed as the cathode and anode, respectively. Under these conditions, it is found that the wicking effect of the cathode is markedly improved. In carrying out the process of the invention, it was observed that a thin layer of molten phosphorus formed on the outer surface of the vertical cathode above the level of the molten pool of phosphorus before any current was impressed upon this system. As soon as the current was caused to flow, wicking became rapid, occurring substantially over the entire surface of the cathode. The thin layer of phosphorus contacting the cathode was continuously maintained for a prolonged period without the formation of spongy masses and without gas blanketing of the cathode. The rate of the wicking is faster with some metals than with others. The thickness of the phosphorus layer on the metal surfaces varies depending upon the metal employed.

It is considered that the unexpected beneficial results obtained by the practice of this invention are due to the combination of a multitude of projections and acutely angled grooves on the lands of the electrode. The former providing points across which reaction occurs, and the latter preventing gas blanketing by aiding the upward flow of gaseous products. But it should be understood that this invention is in no way dependent upon theoretical considerations and the explanation of a methanism is given to assist in the better understanding of the invention.

Reactive materials, other than phosphorus, which may be suitably utilized in the practice of this invention are sulfur, and organic compounds, such as for example, acetol, o-ethoxyacetanilide, N-tolyacetamide, acetoacetanilide, acetonaphthol-(1,2), acetophenone, diacetyl disulfide, acetylsalol, acetylene dibromide, acetylene dichloride, aldehydin, allyl acetate, allyl acetone, allyl acetonitrile, allyl isoamyl ether, allyl aniline, allyl benzoate, allyl bromide, allyl isocyanide, allyl formate, allyl iodide, allyl chloride, allyl iso-thiocyanate, allyl thiocyanate, aminoacetophenone, o-amino benzaldehyde, o-amino benzonitrile, amino camphor, p-amino diethylaniline, o-dimethyl aniline, m-dimethyl aniline, allyl acetic acid, aniline, anisaldehyde, anisole, azobenzene, benzaldehyde, benzene, benzil, benzophenone, benzyl alcohol, benzyl chloride, anthranil, arsenic diethyl, arsenic triphenyl, bromobenzene, dimethylazobenzene, azoxybenzene, benzyl formate, butyl acetate, bromoform, bromotoluene, caproic acid, carbon tetrachloride, o-chloroaniline, chlorobenzaldehyde, chlorobenzene, chloroform, cyclohexane, cyclohexanol, cyclohexene, cymene, dibenzyl, dibromoethane, ethylacetate, ethyl acrylate, ethyl acrylic acid, furfural, furfural acetone, furan, furfuryl acetate, geranyl formate, germanium tetraethyl, glucose pentabutyrate, glucose pentapropionate, glycerol iso-amyl ether, glycerol n-butyl ether, acrylonitrile, oleic acid, octyl alcohol, octyl acetate, phenol, nitropropane, nitrophenetole, nitrocresol, chloronitrobenzene, nitrobenzene, octylene, octane, toluene, ammonium iodote, beryllium stearate, carbon disulfide, carbon selenosulfide, germanium chloroform, dibasic sodium phosphate, silicone oils and related compounds. It will be seen that most of these are of 1 to 10 carbon atoms, preferably of about 1 to 20 carbon atoms per molecule.

Utilizing these reactants in accordance with the invented process, products may be formed, as illustrated below.

| Reactant: | Products formed |
|---|---|
| Toluene with mineral acid electrolyte | Benzaldehyde |
| Benzene in HCl electrolyte | Monochlorobenzene |
| Nitrobenzene | Aniline, p-amino, phenol, azoxybenzene. |
| Bromobenzene | Benzene |
| Acrylonitrile | Adiponitrile |
| Carbontetrachloride | Chloroform |
| Monochlorozenzene | Benzene |

These are only a few illustrations of the various reactions which may be effected. During the reaction the reactant material preferentially wets the electrode and reacts there, usually either to be reduced or oxidized depending on the charge of the electrode. Thus, alcohols may be oxidized to aldehydes and acids, aldehydes may be reduced, nitro groups may be converted to amino radicals, chlorohydrocarbons may be reduced to hydrocarbons, and so forth.

The diaphragm may or may not be coated as illustrated in FIG. 1. However, in the preferred embodiment of the invention, when phosphorus is the reactive material, a coating of glass fabric gives beneficial results.

The following examples are presented to additionally describe the invention without being limiting. All parts are by weight and all temperatures are in degrees centigrade unless otherwise mentioned.

Examples 1–5 were carried out by utilizing each of the cathodes described in Table I in an electrolytic cell. In particular, the procedure in each instance comprised utilizing one of the described cathodes in combination with a graphite anode surrounded by a porcelain diaphragm in an electrolytic cell. An aqueous electrolyte of six percent hydrochloric acid plus 0.05 percent lead was utilized as the anolyte and the catholyte. In each run, a different cathode was utilized, and the temperature of the electrolyte mixture was maintained at the various levels set forth in Table II. Molten yellow phosphorus was introduced to the cell so that the bottom portion of the vertical cathode was in contact with said phosphorus. Generally, it was observed that the phosphorus wicked up the cathode prior to the activation of the cell. To activate the cell a cathodic current was applied. The current densities in amperes per square foot are given in Table II. The current density was gradually increased to ascertain the maximum current that could be utilized without gas blanketing of the electrode. When the electrode becomes gas blanketed the voltage goes up and the amperage goes down resulting in gas polarization of the electrode. Such polarization, in effect, decreases cell efficiency and makes the cell practically inoperative. In each instance, during the operation of the various cells, the catholyte gas was found to contain substantially pure phosphine.

Cathodes particularly described in Table I, measuring 1 unit width by 4 units lengths, were individually utilized in the apparatus set forth above. The obtained results are given hereinafter in Table II.

TABLE I

| Cathode type | Surface description |
|---|---|
| A | A flat lead plate was drawn and its surface scraped on both sides with Aloxite[1] #50 metal cloth to remove the oxide coating, causing surface scratches to appear. |
| B | A flat lead plate was vertically grooved on both sides to produce eight grooves per inch. The depth of each groove was approximately ⅛ of an inch, and the opening of each groove measured approximately ⅛ of an inch. Said grooves may be generally described as "V" type grooves. |
| C | A flat lead plate was grooved on both sides to define lands along the longitudinal axis of the electrode. The electrode produced was doubly drawn whereby the lands defined by the grooves were further flattened as shown in FIGURE 3, without surface abrasion. Pertinent dimensions of the grooves and lands were as follows: depth of the longitudinal grooves was approximately 1/14 of an inch; width of the longitudinal grooves was approximately 1/32 of an inch; and the width of the lands was approximately 1/11 of an inch. |
| D | A type C electrode was roughened or abraded with Aloxite[1] #50 metal cloth, at approximately a 10 degree angle to the longitudinal grooves, as substantially shown in FIGS. 3 and 4. The grooves produced by the metal cloth varied in depth from about 1/500 of an inch to about 1/25 of an inch. |
| E | A type C electrode was abraded with Aloxite[1] 24E metal cloth, slightly off vertical, at approximately a 10 degree angle to the longitudinal grooves, substantially as shown in FIGS. 3 and 4. The grooves produced by the metal cloth varied in depth from about 1/250 of an inch to about 1/25 of an inch. |

[1] Aloxite is a metal cloth produced by the Carborundum Company, and is available in standard grit sizes, such as #50, 24E and the like.

TABLE II

| Ex. | Cathode Type | Amperes | Temperature (° C.) | Amperes per Square Foot at which Gas Blanket Formed | Hours Running Time |
|---|---|---|---|---|---|
| 1 | A | 1 | 90–93 | 18 | 1.5 |
| 2 | B | 2 | 89–94 | 36 | 1.5 |
| 3 | C | 7 | 91–97 | 126 | 1.5 |
| 4 | D | 15 | 91–96 | 234 | 0.5 |
| 5 | E | 12 | 91–96 | 216 | 0.5 |

Cathodes B, C, D and E did not reveal the formation of spongy masses, during the operation of the electrolytic cells. Continued operation of Examples 4 and 5 containing cathodes D and E, respectively, indicates that cathode E performs most efficiently over a prolonged period. In particular, an electrolytic cell utilizing a type E cathode was continuously run for a period of forty-two days at desirable amperage levels, such as from about 140 amperes per square foot to 180 amperes per square foot, without gas blanketing or spongy mass formation. The utilization of the cathode of this invention effectively avoids gas blanketing and the accompanying gas polarization of said cathode in a electrolytic cell as hereinbefore described. Catholyte gas contained from 80 to 87 percent phosphine.

It will be recognized by those skilled in the art that various modifications of the invention are possible, some of which have been described hereinbefore. Accordingly, the above description should not be construed as limiting the invention, except as defined by the appended claims.

What is claimed is:

1. An electrode having an electrically conductive surface comprising a plurality of longitudinal grooves and lands defined by said grooves on the electrically conductive surface, said lands having thereon, at an acute angle to said longitudinal grooves, a multiplicity of grooves which define a multiplicity of projections.

2. An electrode in accordance with claim 1 wherein projections have thereon a multitude of burrs.

3. An electrode in accordance with claim 1 wherein the electrically conductive surface is made of lead.

4. An electrode in accordance with claim 1 wherein the acute angle is in the range of 1 degree to 75 degrees.

5. An electrode in accordance with claim 1 wherein the depth of the longitudinal grooves is in the range of about 1/32 of an inch to 1/8 of an inch.

6. An electrode in accordance with claim 5 wherein the acute angle is in the range of 5 degrees to 15 degrees.

7. An electrolytic cell comprising a wicking type electrode having a plurality of longitudinal grooves and lands defined thereon, said lands having thereon, at an acute angle to said longitudinal grooves, a multiplicity of grooves which define a multiplicity of projections, an anode in operative relation with said wicking type cathode, and a diaphragm positioned between the cathode and the anode in operative relation therewith.

8. An electrolytic cell in accordance with claim 7 wherein the cathodic projections have thereon a multitude of burrs.

9. An electrolytic cell in accordance with claim 7 wherein the cathode is made of lead.

10. A process for the mass transfer of reactive material to a cathode in an electrolytic cell having an anode, a cathode, a diaphragm and an electrolyte comprising contacting and reactive material, having low conductivity and substantial insolubility in the electrolyte, with a cathode having defined thereon a plurality of longitudinal grooves and lands, said lands having abraded thereon a multiplicity of projections, at an acute angle to said longitudinal grooves, whereby the reactive material wicks up the electrode substantially to cover its entire surface, maintaining an electrical current through said cathode, electrolyte and anode to effect reaction, and recovering the product formed at a catholyte gas.

11. A process in accordance with claim 10 wherein the reactive material is phosphorus and the product is phosphine.

12. A process in accordance with claim 11 wherein the projections define with the longitudinal grooves an angle in the range of 1 degree to 75 degrees.

13. A process in accordance with claim 12 wherein the projections have thereon a multitude of burrs.

14. A process in accordance with claim 10 wherein the electrical current is in the range of 60 amperes per square foot to 300 amperes per square foot.

References Cited

UNITED STATES PATENTS

| | | | |
|---|---|---|---|
| 761,284 | 5/1904 | Buchner | 204—74 |
| 775,752 | 11/1904 | Jahn | 204—92 |
| 1,536,419 | 5/1925 | Burwell | 204—74 |
| 1,771,091 | 7/1930 | Lawaczeck | 204—283 |
| 3,251,756 | 9/1966 | Miller | 204—101 |

ROBERT K. MIHALEK, *Primary Examiner.*

JOHN H. MACK, *Examiner.*

H. M. FLOURNOY, *Assistant Examiner.*

UNITED STATES PATENT OFFICE
CERTIFICATE OF CORRECTION

Patent No. 3,361,656 January 2, 1968

George T. Miller

It is certified that error appears in the above identified patent and that said Letters Patent are hereby corrected as shown below:

Column 1, line 37, "transfer" should read -- transfers --. Column 2, line 65, after "is" insert -- a --. Column 3, line 47, "fool" should read -- wool --. Column 4, line 31, "surface" shou read -- surfaces --; line 46, "brade" should read -- abrade --. Column 6, line 53, "methanism" should read -- mechanism --. Colu 7, line 12, "10" should read -- 40 --; line 26, "Monochlorozenzen should read -- Monochlorobenzene --. Column 9, line 32, "and" should read -- a --. Column 10, line 8, "at" should read -- as -

Signed and sealed this 24th day of February 1970.

(SEAL)
Attest:

Edward M. Fletcher, Jr.
Attesting Officer

WILLIAM E. SCHUYLER, JR.
Commissioner of Patents